(12) United States Patent
Alajajyan

(10) Patent No.: US 7,717,366 B2
(45) Date of Patent: May 18, 2010

(54) CONTROLLED MAGNETIC BRAKING OF FISHING REEL SPOOL

(76) Inventor: Harout Alajajyan, 22448 S. Summit Ridge Cir., Chatsworth, CA (US) 91311

( * ) Notice: Subject to any disclaimer, the term of this patent is extended or adjusted under 35 U.S.C. 154(b) by 20 days.

(21) Appl. No.: 12/215,344

(22) Filed: Jun. 27, 2008

(65) Prior Publication Data

US 2009/0321549 A1 Dec. 31, 2009

(51) Int. Cl.
*A01K 89/01* (2006.01)
(52) U.S. Cl. ..................... 242/288
(58) Field of Classification Search ............... 242/288, 242/291
See application file for complete search history.

(56) References Cited

U.S. PATENT DOCUMENTS

| | | | |
|---|---|---|---|
| 4,031,652 A | 6/1977 | Johnson | |
| 4,585,183 A * | 4/1986 | Puryear | 242/288 |
| 4,586,674 A * | 5/1986 | Nakajima | 242/288 |
| 4,674,699 A * | 6/1987 | Fukushima et al. | 242/261 |
| 4,779,814 A | 10/1988 | Uetsuki et al. | |
| 4,830,308 A * | 5/1989 | Puryear | 242/288 |
| 5,556,048 A * | 9/1996 | Hashimoto | 242/288 |
| 5,692,693 A * | 12/1997 | Yamaguchi | 242/288 |
| 5,749,534 A * | 5/1998 | Morimoto | 242/288 |
| 6,065,700 A * | 5/2000 | Kim | 242/288 |
| 6,206,311 B1 * | 3/2001 | Kim et al. | 242/288 |
| 6,412,722 B1 * | 7/2002 | Kreuser et al. | 242/288 |
| 6,964,387 B2 * | 11/2005 | Hyun | 242/288 |
| 6,974,100 B2 * | 12/2005 | Moosberg | 242/288 |
| 7,165,737 B2 * | 1/2007 | Nakagawa et al. | 242/288 |

FOREIGN PATENT DOCUMENTS

DE 3230572 A1 * 3/1983

* cited by examiner

*Primary Examiner*—Emmanuel M Marcelo
(74) *Attorney, Agent, or Firm*—William W. Haefliger

(57) ABSTRACT

An adjustable fishing reel spool brake, the reel having a body, comprising in combination, the spool having a metallic zone that rotates as the spool rotates, a magnetic flux provider carried on the reel body, the provider adjustably movable to vary magnetic flux establishment in the path of rotation of said zone and acting to resist and thereby brake reel rotation.

8 Claims, 3 Drawing Sheets

CONTROLLED MAGNETIC BRAKING OF FISHING REEL SPOOL

BACKGROUND OF THE INVENTION

This invention relates generally to control of fishing line travel from a fishing reel, as during casting, and more particularly concerns adjustable magnetic control of reel rotation, as during casting.

In the past fisherman relies primarily upon thumb or finger pressure application to the line wound on the reel spool to control casting as during line unwinding from the rotating spool. This method was generally objectionable due to factors such as uneven thumb pressure to the rotating line, the line bundle, and leading to inaccurate casting. There is need for an improved and simple control method and apparatus for providing even and reliable automatic control of spool rotation.

SUMMARY OF THE INVENTION

It is a major object of the invention to provide improvements meeting the above described need. Basically, the invention meets this need by provision of an adjustable fishing reel spool brake, and comprises:

a) the spool having a metallic zone that rotates as the spool rotates, b) a magnetic flux provider carried on the reel body, the provider adjustably movable to vary magnetic flux established in the path of rotation of said zone and acting to resist and thereby brake reel rotation.

As will be seen, the magnetic flux provider typically has magnetic flux transmission means that extends proximate the surface of the metallic zone during reel rotation. Such transmission means typically and preferably includes two pole pieces and an adjustably positioned magnet or magnets that transmit flux to said pole pieces, there being an adjuster associated with the provider that is adjustable to adjust positioning of the magnet or magnets relative to the pole pieces.

Another object includes the provision of means, including a rotor, carrying the magnets to be selectively adjustably rotatable, in offset relation to the spool axis of rotation.

A yet further object includes provision of detent means to releasably hold the magnet or magnets in selected rotated position relative to the pole pieces.

An additional object includes provision of both plus and minus flux providing elements that are selectively rotatable between the pole pieces to adjust their exposure to the pole pieces, and adjust flux transmission by the pole pieces to the spool metallic zone, for adjustable braking effect.

A further object includes provision for carriage of the plus and minus flux elements on a reel wall to be frontwardly closely exposed to the rotating spool structure to produce braking eddy currents in that structure, and to have rearward exposure to the carriage means or rotor for easy, selective manual adjustment, thereby to provide for accurate spool braking adjustment.

These and other objects and advantages of the invention, as well as the details of an illustrative embodiment, will be more fully understood from the following specification and drawings, in which:

DRAWING DESCRIPTION

DETAILED DESCRIPTION

Figure 1:
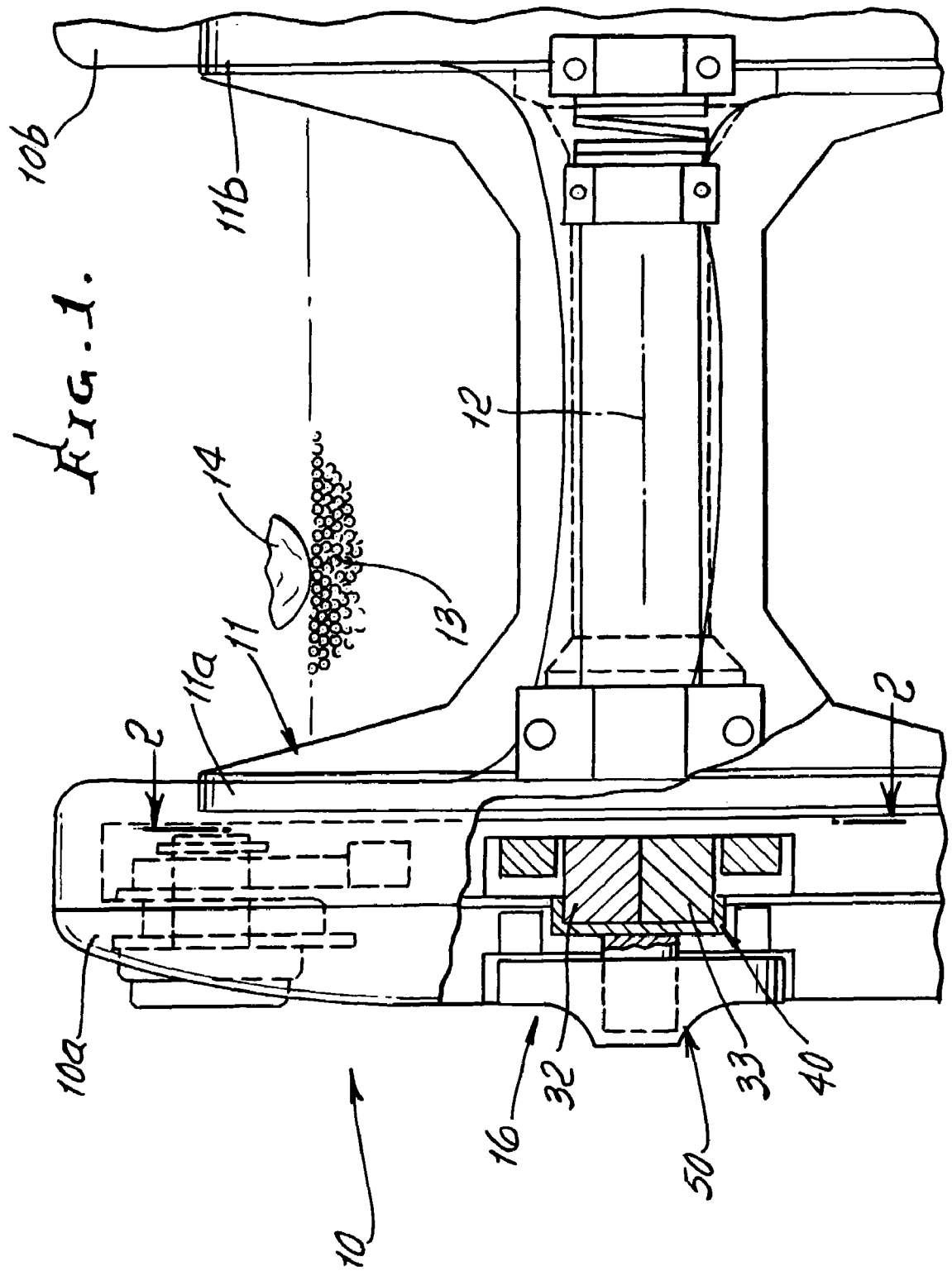
FIG. 1 is an axial section taken through a fishing reel structure including a line winding spool.

In the drawings, a fishing reel 10 carries a rotatable, line winding spool 11 that rotates about axis 12. The reel has end flanges 10a and 10b, and the spool also has end flanges 11a and 11b. Numeral 13 designates fishing line wound on and about the spool, and which rapidly unwinds and leaves the spool as the spool rotates during casting. It is desired that the rate of line unwinding be carefully regulated during casting, and in the past, the fisherman would place his thumb or finger against the rotating line bundle as at position 14, which was unsatisfactory as referred to above.

Figure 2:
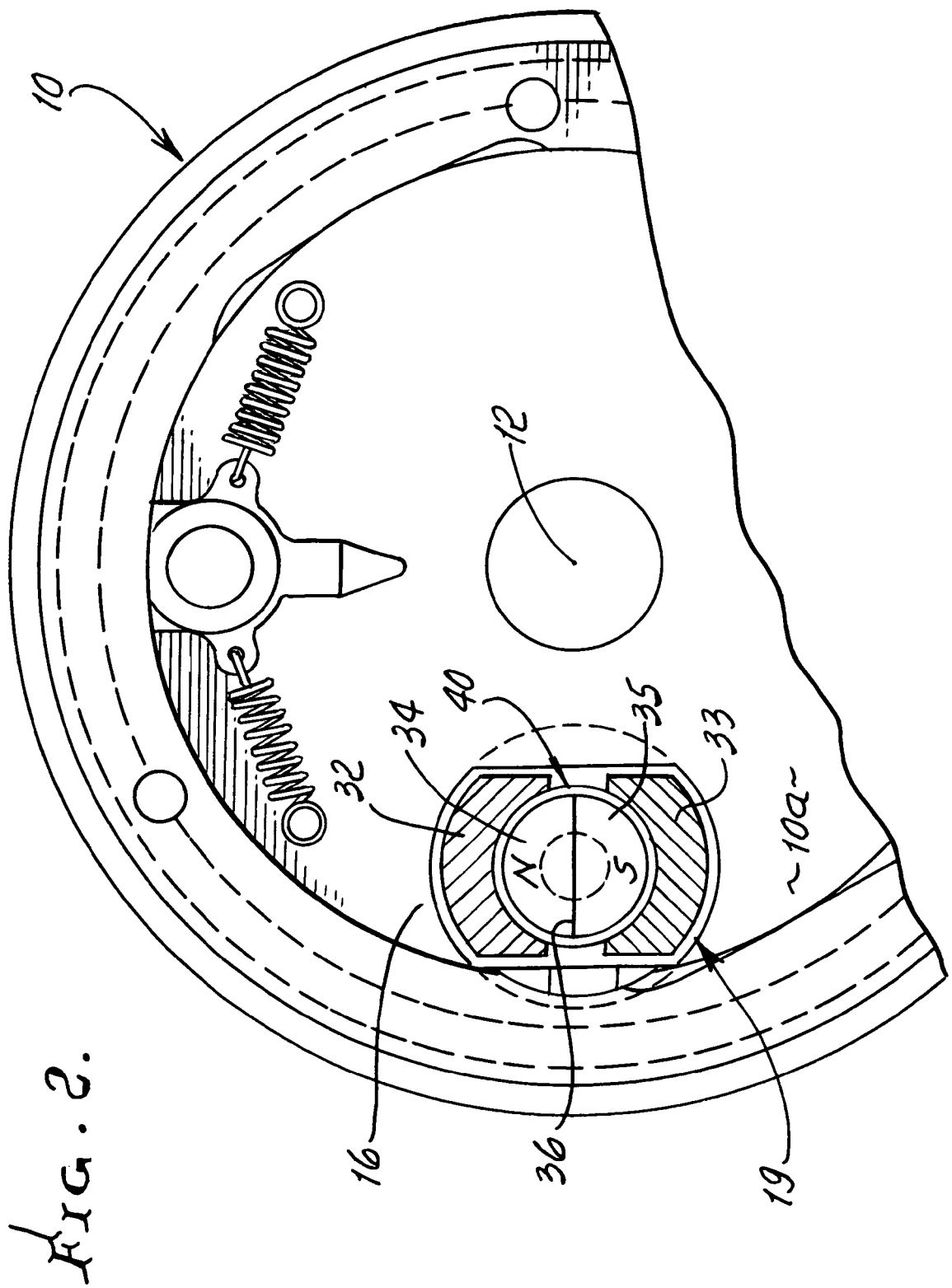
FIG. 2 is an axial view taken in section on lines 2-2 of FIG. 1.

In accordance with the invention, a magnetic flux provider is carried by an element of the reel body, as for example is designated at 16, in association with flange 10a, but offset from the reel axis 12. See for example, the flux provider 19 in FIG. 2, offset from axis 12. The provider will be understood as having adjustably movable structure to vary magnetic flux establishment, including flux strength, that intercepts the rotating spool. See in this regard, the flux lines of force designated at 25 in FIG. 3, intercepted by the rotating spool portion 26 forming wall 27 facing the provider 19. Portion or zone 26 and wall 27 are metallic, and may for example consist of aluminum, in which eddy currents are produced in portion 26 exerting braking force on the spool, resisting its rotation.

The provider has magnetic flux transmission means extending proximate the wall surface 27 of the rotating spool, there being a slight gap 30 between 27 and the magnetic flux transmission means. The latter may include two arching fixed position pole pieces 32 and 33, and adjustably positioned magnet or magnets 34 and 35 that transmit flux to the pole pieces. The degree of flux transmitted to the pole pieces and to the spool zone 26, depends upon position adjustment of the magnets. For that purpose, magnet position adjuster, indicated generally at 19a, is provided in association with the provider 19, to adjust the magnet positioning relative to the fixed position pole pieces, to controllably vary magnet flux transmitted to the spool element or portion 26.

As shown, two semi-circular magnets 34 and 35 are provided and supported by a cup 40 having a circular rim 40a surrounding portions of the magnets. Other convexly curved portions 34a and 35a of the semicircular magnets extend in close surface proximity to the concave inner sides 32a and 33a of the pole pieces, as in FIG. 4. Surface portions 34a and 35a define a circle, and a division line 36 is defined by the flat inner sides of the two magnets. Cup rim 40a terminates in facing relation to the pole pieces.

Figure 4:
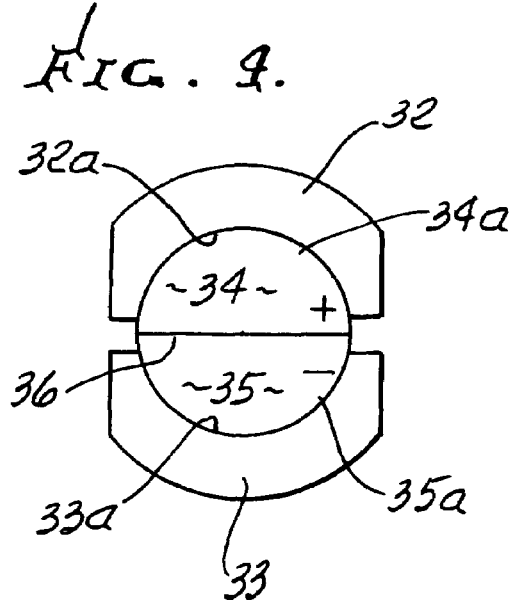
FIG. 4 is a frontal view of magnet structure and pole pieces, with the magnetic structure in one adjusted position.
Figure 5:
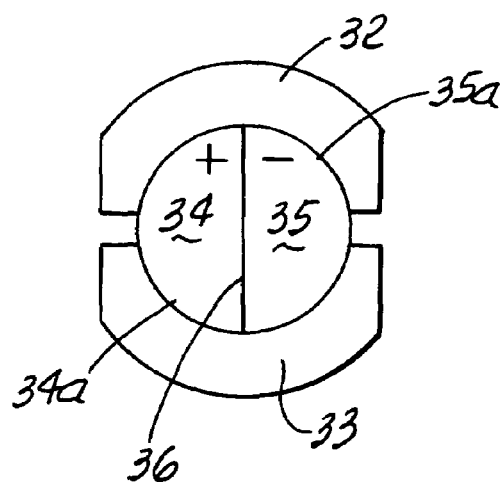
FIG. 5 is a view like FIG. 4, with the magnetic structure in another adjusted position.

FIG. 4 shows the polarity + magnet 34 curved side 34a bounded by the concave inner side 32a of pole piece 32; the polarity − magnet curved side 35a being bounded by the concave inner side 33a of pole piece 33. This magnet positioning corresponds to maximum flux transmission at 25, for maximum spool braking effect. FIG. 5 shows the magnets 34 and 35 rotated 90° to the left, so that approximately half of magnet 34's curved side 31a lies adjacent approximately half of the curved inner side 32a of pole piece 32; and approximately the other half of its curved side 34a lies adjacent approximately half of the curved under side 33a of pole piece 33.

Likewise, approximately half of the curved side 35a of magnet 35 lies adjacent about half of the curved inner side 32a of pole piece 32, and approximately half of the curved side 35a of magnet 35 lies adjacent about half of curved inner side 33a of pole piece 33. This condition corresponds to minimum or no flux transmission at 25, since for example pole piece 32 is exposed to both + and − (about equal) polarities of 34 and 35; and pole piece 33 is likewise exposed to both + and − (about equal) polarities of 34 and 35.

Between the two magnet rotary positions of FIGS. 4 and 5 are a large number of magnet selectable rotary positions which correspond to incrementally selectable flux transmission to the circular metallic portion 26 of the spool, and therefore correspond to different level spool braking effects, each of which provides smooth regulated braking, as opposed to substantially irregular and uncomfortable braking effect when only manual or thumb engagement of the spool winding bundle is utilized for braking.

Figure 3:
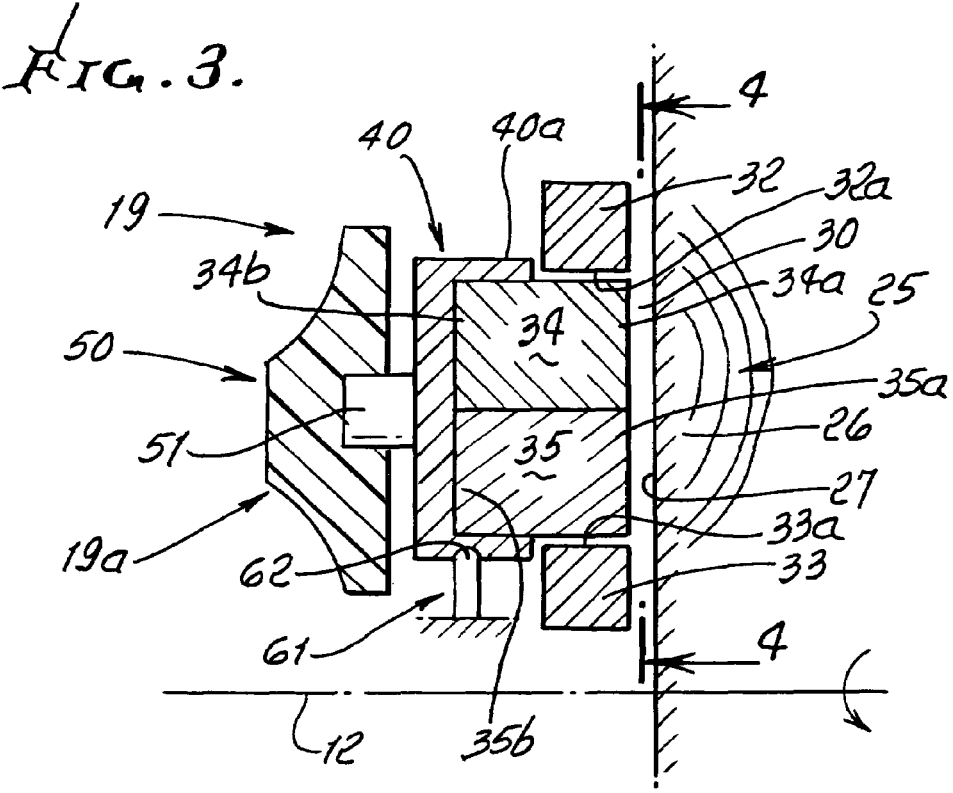
FIG. 3 is a section taken through elements of a magnetic flux provider, and associated structure.

FIGS. 1 and 3 show a selector knob or control 50 attached at 51 to the cup 40, for selectively rotating the magnets, as described.

A suitable detenting means may be provided as at 61 for example, to retain the cup in any of a series of rotary positions between the position of FIGS. 4 and 5. The detent pin 62 may be spring-urged to allow manual forcible over-ride of any selected detenting position, allowing manually controlled increase or decrease in spool magnetic braking effect. The user can also press his thumb against the remaining line bundle on the spool to suddenly easily stop its rotation, and line pay-out, as after the cast bait or hook weight bundle strikes the water.

I claim:

1. An adjustable fishing reel spool brake, the reel having a body, comprising in combination:
    a) the spool having a metallic zone that rotates as the spool rotates, and defines a path of rotation,
    b) a magnetic flux provider carried on the reel body, the provider adjustably movable to vary magnetic flux establishment in said path of rotation of said zone and acting to resist and thereby brake reel rotation,
    c) the provider having magnetic flux transmission means that extends proximate said metallic zone during reel rotation,
    d) the transmission means including two pole pieces and the provider including an adjustably positioned magnet or magnets that transmit flux to said pole pieces, there being an adjuster associated with the provider that is adjustable to adjust positioning of the magnet or magnets relative to the pole pieces,
    e) there being means such as a rotor carrying the magnet or magnets to be selectively adjustably rotatable in offset relation to the spool axis of rotation,
    f) there also being detent means to releasably hold the magnet or magnets in selected rotated positions, relative to the pole pieces,
    g) the magnets including + and − magnetic flux elements that are selectively rotatable between said pool pieces, to adjust flux transmission by the pole pieces to said spool metallic zone.

2. The combination of claim 1 including means carrying the provider to be selectively adjustably rotatable.

3. The combination of claim 1 wherein the magnets are + and − polarity semi-circular magnets having portions confined to rotation in a gap provided between two pole pieces.

4. The combination of claim 3 wherein the magnets are configured to provide maximum flux transmission in a first rotary position of the magnets, and to provide minimum flux transmission in a second rotary position of the magnets, said first and second rotary positions separated by 90° of magnet rotation.

5. An adjustable fishing reel spool brake, the reel having a body, comprising in combination:
    a) the spool having a metallic zone that rotates as the spool rotates, and defines a path of rotation,
    b) a magnetic flux provider carried on the reel body, the provider adjustably movable to vary magnetic flux establishment in said path of rotation of said zone and acting to resist and thereby brake reel rotation,
    c) the provider having magnetic flux transmission means that extends proximate said metallic zone during reel rotation,
    d) the transmission means including two pole pieces and an adjustably positioned magnet or magnets that transmit flux to said pole pieces, there being an adjuster associated with the provider that is adjustable to adjust positioning of the magnet or magnets relative to the pole pieces,
    e) there being means carrying the magnet or magnets to be selectively adjustably rotatable in offset relation to the spool axis of rotation,
    f) and said means includes a cup having a rim extending about magnets and terminating in facing relation to pole piece portions that are closely adjacent the magnets.

6. The combination of claim 5 including detent means to releasably hold an element of the provider in a selected position corresponding to selected magnetic flux establishment in said zone.

7. The combination of claim 5 including detent means to releasably hold the magnet or magnets in selected rotated positions, relative to the pole pieces.

8. The combination of claim 5 wherein the magnets include + and − magnetic flux elements that are selectively rotatable between said pole pieces, to adjust flux transmission by the pole pieces to said spool metallic zone.

* * * * *